United States Patent [19]

Sederquist et al.

[11] 4,372,759
[45] Feb. 8, 1983

[54] ELECTROLYTE VAPOR CONDENSER

[75] Inventors: Richard A. Sederquist, Newington; Donald F. Szydlowski, East Hartford; Richard D. Sawyer, Canton, all of Conn.

[73] Assignee: United Technologies Corporation, Hartford, Conn.

[21] Appl. No.: 297,481

[22] Filed: Aug. 28, 1981

[51] Int. Cl.³ ............................................. B01D 19/00
[52] U.S. Cl. ........................................ 55/73; 55/83; 55/257 R; 55/269; 55/462; 429/17; 165/111
[58] Field of Search .................. 55/73, 68, 80, 84, 90, 55/257 R, 261, 269, 462, 465; 165/111; 429/17

[56] References Cited

U.S. PATENT DOCUMENTS

| | | | |
|---|---|---|---|
| 1,957,006 | 5/1934 | Wescott | 55/73 |
| 2,675,891 | 4/1954 | Frey | 55/72 |
| 3,222,223 | 12/1965 | Platner | 136/86 |
| 3,511,715 | 5/1970 | Angus | 136/86 |
| 3,531,326 | 9/1970 | Stankavich | 429/17 |
| 3,865,929 | 2/1975 | Ehlig | 423/488 |
| 3,923,098 | 12/1975 | Ares | 165/111 |
| 3,948,624 | 4/1976 | Fornoff et al. | 55/73 |
| 4,037,024 | 7/1977 | Landau | 429/17 |
| 4,040,435 | 8/1977 | Elzinga | 429/14 |
| 4,239,511 | 12/1980 | Austermuhle | 55/269 |

Primary Examiner—Bernard Nozick
Attorney, Agent, or Firm—Harry J. Gwinnell

[57] ABSTRACT

A system is disclosed for removing electrolyte from a fuel cell gas stream. The gas stream containing electrolyte vapor is supercooled utilizing conventional heat exchangers and the thus supercooled gas stream is passed over high surface area passive condensers. The condensed electrolyte is then drained from the condenser and the remainder of the gas stream passed on. The system is particularly useful for electrolytes such as phosphoric acid and molten carbonate, but can be used for other electrolyte cells and simple vapor separation as well.

8 Claims, 3 Drawing Figures

ELECTROLYTE VAPOR CONDENSER

The Government has rights in this invention pursuant to Contract No. DE-AC03-77ET11302 awarded by the Department of Energy.

DESCRIPTION

1. Technical Field

The field of art to which this invention pertains is for condensation and saparation of gaseous components from a multi-component gas stream, and specifically the removal of electrolyte from a gas stream.

2. Background Art

In the operation of a fuel cell, air or other oxidant is pumped in high volume past the cathode side of the fuel cell. In passing the cathode, the oxygen (in the case of air) is depleted and water vapor is picked up by the oxygen depleted air and transported away from the cathode as cathode exhaust. A substantial amount of electrolyte vapor is also dragged out of the fuel cell at this point along with these gases because of the high operating temperature of the fuel cell which tends to vaporize the electrolyte. For example, fuel cells are typically run at 400° F. (204° C.) producing phosphoric acid vapors. Efficient operation of the fuel cell dictates that the water vapor be recovered, for example for reaction in the steam reformer. However, in addition to phosphoric acid containing water being unusable for steam reforming purposes, it is also highly corrosive to any water condensing system.

Complicated and intricate heat exchangers in large bulk have been employed to liquify gas mixtures which are then subsequently separated into their component parts at a later time. Note U.S. Pat. Nos. 3,511,715 and 3,222,223. Another common method is the employment of water condensers with the electrolyte vapor being condensed and separated at a later time. Note for example, U.S. Pat. Nos. 4,037,024 and 4,040,435. Other attempts at separating acids from gas streams have included the use of conventional mist eliminators (note U.S. Pat. No. 3,948,624) and the use of a fluid stream (note U.S. Pat. No. 3,865,929).

Accordingly, a system for removing and recapturing electrolyte from such a gas stream which is relatively simple and efficient would be highly desirable in this art.

DISCLOSURE OF INVENTION

The present invention is directed to the method of removing electrolyte from a fuel cell gas stream. The gas stream containing the electrolyte is first cooled to a temperature below the vaporization temperature of the electrolyte, and then passed over a high surface area passive, uncooled condenser. The condensing surfaces are so placed to provide sufficient surface area, sufficient residence time and sufficiently small molecular diffusional distance to allow coalescence and condensation of the electrolyte, without condensing other components of the gas stream such as water.

The foregoing, and other features and advantages of the present invention, will become more apparent from the following description and accompanying drawing.

BEST MODE FOR CARRYING OUT THE INVENTION

Figure 2:
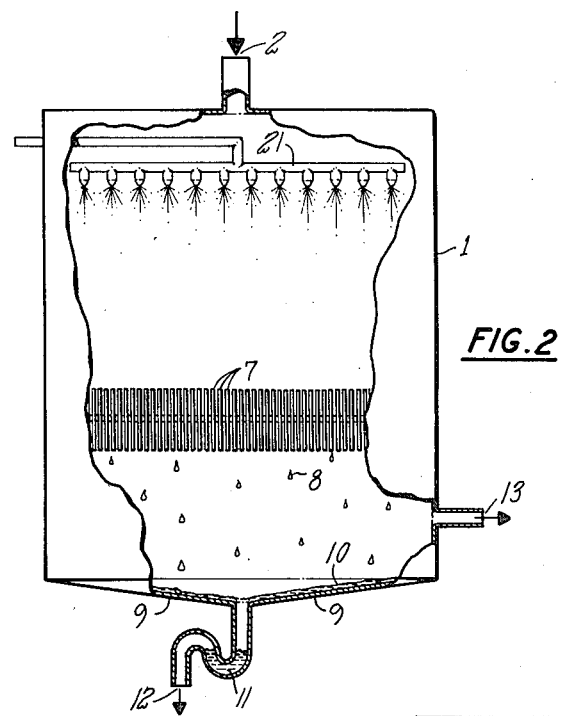
FIGS. 1 and 2 show typical systems according to the present invention.

The first step in the process of the present invention is to cool the electrolyte vapor. The vapor is initially cooled to a temperature below its vaporization temperature which can be determined from a liquid-gas phase diagram for the particular electrolyte. For example, for a phosphoric acid electrolyte, it was determined that cooling of the air exhausted from the fuel cell to about 260° F. (127° C.) was sufficient to cause condensation on the passive condensation plates of over 90% of the acid in the gas. While any conventional heat exchanger which is corrosion resistant in the system (FIG. 1) can be used for this cooling step, a spray cooling device (FIG. 2) or plastic cooling bags can also be used. Less energy (as much as 90% less) is utilized in this step than in conventional condensing utilizing heat exchangers, since cooling and not condensation is the object. Utilizing conventional spray nozzles (21 in FIG. 2), either a cooling gas such as air or a vaporizable coolant such as water can be injected into the gas stream.

The thus cooled gas stream is next passed over the high surface area condenser. The condenser is a passive, i.e. non-cooled, condenser which provides the surface for coalescing and condensing of the cooled electrolyte molecules. The condensing surfaces are of such size and spaced apart so as to provide sufficient surface area, sufficient residence time and sufficiently small molecular diffusional distance to allow coalescence and condensation of the electrolyte, without condensing other components of the gas stream such as water. The gas stream continues on and the electrolyte is removed by draining the concentrated liquid from the condenser chamber. After the acid is removed, heat and water vapor are extracted from the residual gas by passing the treated gas over conventional condenser tubes.

Advantages of this system over other acid removal techniques such as dry chemical removal and conventional acid scrubbers include reduced size, reduced costs including operating costs, and decreased maintenance. This is a direct result of the use of a passive condenser for the critical step and the high efficiency of this method in removing approximately 90%–99% of the acid from the gas stream. Another advantage of the present system is its simplicity in requiring no critical seals and a very low pressure drop. The low pressure drop is a result of placement and design of the condensing plates so as to produce a non-turbulent laminar flow. The parallel plates shown in the Figures demonstrate an arrangement which would result in such flow. As described above, plates are preferred, however, saddles pall rings, etc. can also be used.

While this invention has primarily been described for separating phosphoric acid or other electrolyte from a gas stream, any condensible material may be separated from the gas stream by the system of the present invention. This system also has particular utility for large molten carbonate systems for which there are currently no good chemical scrubbers.

EXAMPLE

In a fuel cell system designed to provide 40 kw of power continuously for at least 20,000 hours, 497 lbs/hr (225 kgs/hr) of cathode exhaust were produced. An electrolyte vapor condenser according to the present invention comprising 14 Teflon ® duPont de Nemours & Co., Inc. coated stainless steel water cooled heat exchangers and 50 molded carbon particle passive condensers, both approximately 12 inches (30.5 cm) by 5 inches (12.7 cm) was provided as described in FIG. 1. The condensers had about 0.1 inch (0.25 cm) spacing between each plate, and the heat exchange plates had about 0.5 inch (1.27 cm) spacing between each plate. The cathode exhaust existing from the fuel cell at a temperature of about 380° F. (193° C.) was fed into the electrolyte condenser. The gas contained approximately $3.35 \times 10^{-3}$ lbs/hr ($1.5 \times 10^{-3}$ kg/hr) of phosphoric acid and upon exiting from the electrolyte condenser, substantially all of the phosphoric acid had been removed. This removal was qualitatively measured by providing borosilicate rods upstream and downstream of the passive condensing surfaces, and observing the rods severely corroded upstream, while those downstream looked untouched.

Figure 1:
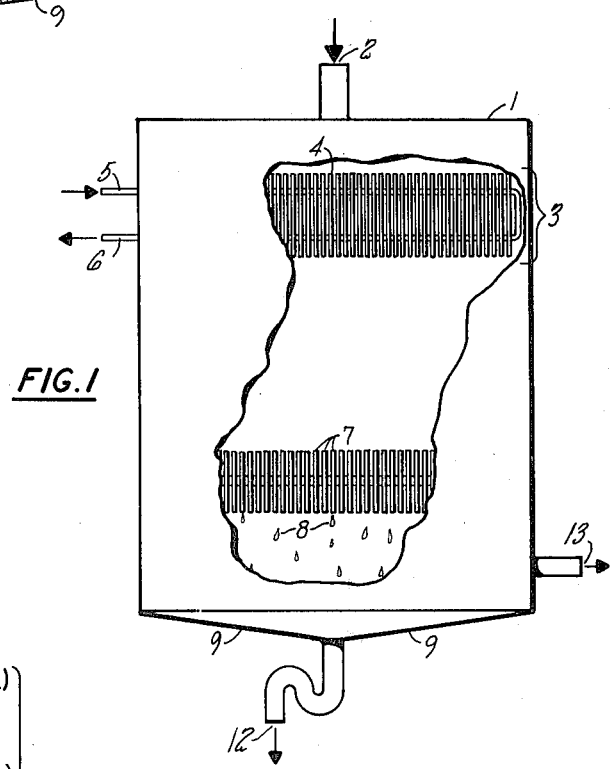

In FIG. 1, 1 indicates the housing enclosing the condenser and heat exchanger which is generally an acid resistant material such as Teflon coated stainless steel. The cathode exhaust enters at 2 and is initially cooled by the heat exchanger 3 made up of, in this instance, a series of parallel Teflon coated stainless steel plates 4 connected by coolant inlet 5 and coolant outlet 6. After passing the heat exchanger, the thus cooled cathode exhaust passes over passive condenser plates 7 where acid droplets 8 form and drop to the bottom of chamber 1. The chamber has a sloping floor 9 which allows accummulation of the acid 10 and ultimate formation of acid pool 11 (shown in FIG. 2) which can be drawn off through conduit 12. The passive condensation plates 7 can be any acid resistant material such as molded graphite plates. Teflon plates can also be used. In addition, the tubes shown in FIG. 3 can be used stacked vertically, i.e. allowing gas flow in the same direction the plates of FIGS. 1 and 2 do. This system is run at atmospheric pressure, although it could be run at higher or lower pressures with corresponding modifications in temperature differentials, gas flow, etc.

Figure 3:
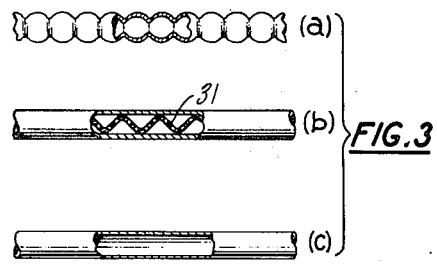
FIGS. 3(a), (b), and (c) disclose examples of condenser elements useful in the present invention.

FIG. 2 represents a similar system with all characters defined as in FIG. 1, with the exception of the use of spray nozzles 21 in place of the heat exchanger 3 of FIG. 1. Any coolant non-reactive with the electrolyte can be forced through spray nozzles 21 such as air or water or inert gas. Volatilization of fluids, such as water, also aid in the cooling. In both Figs., 13 indicates the exit conduit from the electrolyte condenser where the treated gas is subjected to conventional condensers to extract heat and water.

FIGS. 3(a), (b) and (c) demonstrate a variety of condensers which may be used with the present invention. FIG. 3(a) shows a baffle-type condenser; FIG. (3b) shows a tubular condenser containing a porous baffle screen 10; and FIG. 3(c) demonstrates a straight tubular condenser. As stated above, in addition to the energy savings provided by these passive condensers, use of this system provides a low pressure drop, also minimizing system energy requirements.

Other novel aspects of this invention comprise separating the heat transfer function from the mass transfer function. An acid condenser must be a highly effective mass transfer device because of the low concentration of acid vapor in the stream. This requires small flow passages and high surface area or long residence time for drop coalescence. At the same time, the heat transfer requirement is low and can be satisfied with a fairly small energy input. The beauty of the present system is that a small, relatively inefficient, heat exchanger can be used to cool the vapor followed by a compact isothermal condenser with small passages and short diffusion distances. By providing the adequate surface area, the overall size (and cost) of such a system along with the reduced exposure of the heat transfer surfaces to condense the acid represents a definite advancement in this art. This condenser, thus, is not like a conventional heat exchanger, but merely provides the mechanism for an already cooled vapor to condense by film condensation as opposed to drop nucleation.

Although this invention has been shown and described with respect to detailed embodiments thereof, it will be understood by those skilled in the art that various changes in form and detail thereof may be made without departing from the spirit and scope of the claimed invention.

We claim:

1. A method of separating electrolyte vapor from a water vapor containing gas stream in a fuel cell comprising cooling the gas stream containing the electrolyte vapor to a temperature below its vaporization temperature but above the vaporization temperature of the water, contacting the thus cooled gas stream with a high surface area passive condenser to condense the electrolyte vapor and removing the condensed concentrated liquid electrolyte from the gas stream.

2. The method of claim 1 wherein the gas stream is cooled by means of a heat exchanger.

3. The method of claim 1 wherein the electrolyte is phosphoric acid.

4. The method of claim 1 wherein the electrolyte is a carbonate salt.

5. The method of claim 1 wherein the passive condenser is a plurality of closely spaced, parallel, flat plates.

6. The method of claim 5 wherein the plates are carbon.

7. The method of claim 1 wherein the gas stream is cooled by injection of a cooling fluid.

8. The method of claim 7 wherein the fluid is water or air.

* * * * *